(12) United States Patent
Huff et al.

(10) Patent No.: US 8,489,668 B2
(45) Date of Patent: Jul. 16, 2013

(54) OPEN PLATFORM FOR MANAGING AN AGENT NETWORK

(75) Inventors: Gerald B. Huff, Berkeley, CA (US); Scott D. Cook, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1036 days.

(21) Appl. No.: 11/939,401

(22) Filed: Nov. 13, 2007

(65) Prior Publication Data
US 2009/0125618 A1 May 14, 2009

(51) Int. Cl.
*G06F 15/16* (2006.01)

(52) U.S. Cl.
USPC ............ 709/202; 709/201; 709/220; 709/223

(58) Field of Classification Search
USPC ................... 709/202, 201, 220–226; 717/121
See application file for complete search history.

(56) References Cited

U.S. PATENT DOCUMENTS

| | | | | |
|---|---|---|---|---|
| 5,367,635 A * | 11/1994 | Bauer et al. | ............. | 709/221 |
| 5,901,287 A * | 5/1999 | Bull et al. | ............. | 709/218 |
| 6,226,273 B1 * | 5/2001 | Busuioc et al. | ............. | 370/270 |
| 6,459,683 B2 * | 10/2002 | Busuioc et al. | ............. | 370/270 |
| 6,546,387 B1 * | 4/2003 | Triggs | ................. | 1/1 |
| 6,851,115 B1 * | 2/2005 | Cheyer et al. | ............. | 719/317 |
| 6,886,026 B1 * | 4/2005 | Hanson | ............. | 709/202 |
| 7,155,715 B1 * | 12/2006 | Cui et al. | ............. | 717/177 |
| 7,610,588 B1 * | 10/2009 | Hager et al. | ............. | 719/317 |
| 7,676,539 B2 * | 3/2010 | Jhoney et al. | ............. | 709/202 |
| 7,827,230 B2 * | 11/2010 | McMahon et al. | ............. | 709/201 |
| 7,844,552 B2 * | 11/2010 | Cao et al. | ............. | 705/304 |
| 7,865,442 B1 * | 1/2011 | Sowell | ............. | 705/59 |
| 7,925,984 B2 * | 4/2011 | Awe et al. | ............. | 715/762 |
| 7,979,569 B2 * | 7/2011 | Eisner et al. | ............. | 709/231 |
| 2002/0022971 A1 * | 2/2002 | Tanaka et al. | ............. | 705/1 |
| 2002/0059139 A1 * | 5/2002 | Evans | ............. | 705/40 |
| 2002/0198984 A1 | 12/2002 | Goldstein | | |
| 2003/0154271 A1 * | 8/2003 | Baldwin et al. | ............. | 709/223 |
| 2003/0195974 A1 * | 10/2003 | Ronning et al. | ............. | 709/230 |
| 2003/0234808 A1 * | 12/2003 | Huang et al. | ............. | 345/735 |
| 2004/0083113 A1 * | 4/2004 | Cao et al. | ............. | 705/1 |

(Continued)

FOREIGN PATENT DOCUMENTS

| | | |
|---|---|---|
| WO | 0058881 A1 | 10/2000 |
| WO | 0142990 A2 | 6/2001 |
| WO | 0142990 A3 | 6/2001 |
| WO | 0171495 A1 | 9/2001 |

OTHER PUBLICATIONS

Zhang et al., "Classification of Intelligent Agent Network Topologies and a New Topological Description Language for Agent Networks", Intelligent Information Processing III, IFIP TC12 International Conference on Intelligent Information Processing (IIP 2006), Sep. 20-23, 2006.*

(Continued)

*Primary Examiner* — Linglan Edwards
(74) *Attorney, Agent, or Firm* — Park, Vaughan, Fleming & Dowler, LLP

(57) ABSTRACT

Some embodiments of the present invention provide a system for managing software agents. This system enables a user to configure agents and to specify wiring relationships between the agents and other system components. This system also includes a hub component, which is configured to route communications to and from the agents in accordance with user-specified wiring relationships.

17 Claims, 9 Drawing Sheets

U.S. PATENT DOCUMENTS

| | | | | |
|---|---|---|---|---|
| 2004/0088353 | A1* | 5/2004 | Mendelsohn et al. | 709/203 |
| 2005/0114397 | A1 | 5/2005 | Doshi | |
| 2005/0144218 | A1* | 6/2005 | Heintz | 709/202 |
| 2006/0075286 | A1* | 4/2006 | Hodge et al. | 714/5 |
| 2006/0280139 | A1* | 12/2006 | Brace et al. | 370/324 |
| 2007/0266390 | A1* | 11/2007 | Emmerich | 718/105 |
| 2008/0028068 | A1* | 1/2008 | Nochta et al. | 709/224 |

OTHER PUBLICATIONS

Hao Lan Zhang, "Classification of Intelligent Agent Network Topological Description Language for Agent Networks", 2006, in IFIP International Federation for Information Processing, vol. 228, Intelligent Information Processing III, pp. 21-31.

* cited by examiner

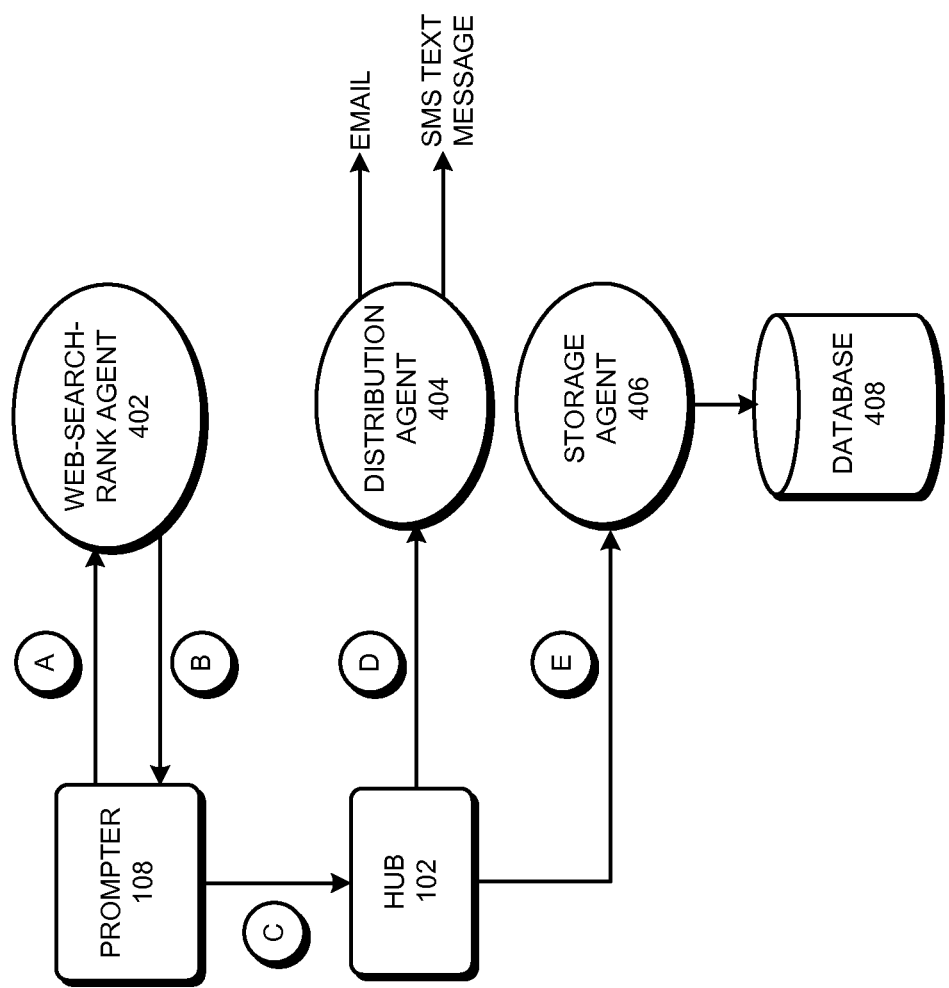

OPEN PLATFORM FOR MANAGING AN AGENT NETWORK

BACKGROUND

Related Art

The present invention relates to software agents. More specifically, the present invention relates to the design of an open platform that facilitates managing a network of software agents.

The widespread proliferation of computer networks and recent advances in software development techniques are making it easier for code written by various authors and hosted at various locations to be integrated to perform high-level computational tasks. In particular, programmers are beginning to use autonomous "software agents," which reside at various locations on a computer network, to perform computational tasks on behalf of a user.

An agent is a complex software entity that can act with a certain amount of autonomy to accomplish computational tasks on behalf of a user. However, unlike "objects," which are defined in terms of methods and attributes, an agent is defined in terms of its behavior. By using agents, a user can effectively complete high-level computational tasks without having to worry about the intricacies involved in performing the low-level operations required to accomplish the tasks. (See http://en.wikipedia.org/wiki/Software_agent.)

Unfortunately, there is presently no easy way for users to coordinate the actions of agents and other system components to perform a desired computational task.

SUMMARY

Some embodiments of the present invention provide a system for managing software agents. This system enables a user to configure agents and to specify wiring relationships between the agents and other system components. This system also includes a hub component, which is configured to route communications to and from the agents in accordance with user-specified wiring relationships.

In some embodiments, the system includes a prompter component, which is configured to call one or more agents at user-specified times and to forward data items returned by the calls.

In some embodiments, the system includes one or more interface components, which are configured to receive requests from a user and to forward the requests to the hub component.

In some embodiments, the one or more interface components can include: an email interface component, which is configured to receive a request from the user via email; a text-message interface component, which is configured to receive a request from the user through a text message; and a voice interface component, which is configured to receive an audio voice request from the user.

In some embodiments, the system is configured to collect payments from users and to distribute payments to agent authors.

In some embodiments, the agents include a storage agent which is configured to store data items in persistent storage.

In some embodiments, the agents include a distribution agent which is configured to distribute messages to users through various communication channels.

In some embodiments, the system provides a user interface which enables the user to graphically wire together agents and system components.

In some embodiments, the system provides an Application Programming Interface (API) to enable other applications to create and modify the configuration of agents and system components.

In some embodiments, the system is configured to communicate messages containing information and queries between agents and system components.

In some embodiments, the data items can be structured in accordance with pre-defined micro-formats, such as the "heard" or "hcalendar" micro-formats. Note that "heard" is a micro-format standard for publishing contact details for people, companies, organizations, and "hcalendar" is a micro-format standard for displaying information about an event.

BRIEF DESCRIPTION OF THE FIGURES

FIG. 4 illustrates an exemplary web-search-ranking system in accordance with an embodiment of the present invention.

DETAILED DESCRIPTION

Figure 1:
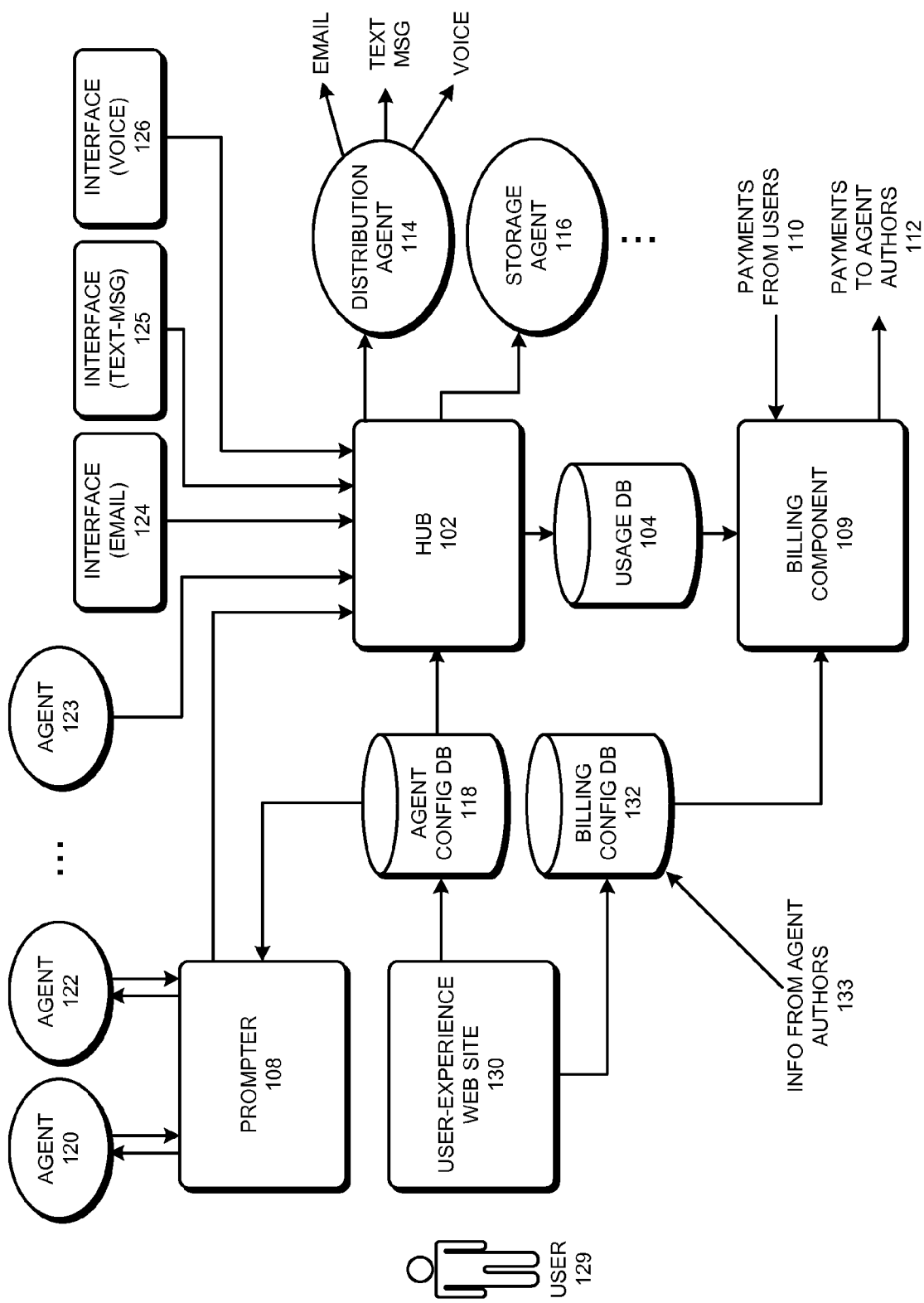
FIG. 1 illustrates a platform which facilitates managing an agent network in accordance with an embodiment of the present invention.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides an open platform that facilitates collecting and distributing messages containing information and queries between agents in an agent network. This open platform can be used to solve a number of problems for system users, including: (1) having personal information "locked up" in sources that are not easy to access; (2) having to manually retrieve public information instead of having it automatically sent; and (3) needing to know how to reach friends, colleagues, family or other relations in social networks. For both consumers and small businesses, this open platform enables a wide variety of services that can make their lives easier.

In essence, the present invention provides an open platform that facilitates the movement of messages containing information and queries from producers to consumers. Within this system, "agents" (software working on the user's behalf) contribute information for a user (person, group, or organization) of the system. This contribution can be "pushed" from the agent (e.g., an agent running on an online action site says "you won your auction") or "pulled" by the agent (e.g., an agent scrapes a user's bank balance). Information that is placed into the system flows to other agents, who can take action on it. Note that agents can respond to a message by: (1) replying to the message in some way (by generating new messages); (2) analyzing the message; (3) storing the message; (4) distributing the message via email, text-messaging or a voice call; (5) forwarding the message to other agents; and (6) performing an automated action using other applications. There are generally no restrictions on what agents can do; the above list merely lists possibilities. Furthermore, note that agents can be hosted on various computing platforms, such as on a local computer system, a server or a mobile device.

Hence, the present invention can facilitate development of a loosely coupled computational system. Based on configuration information received from a user, agents can contribute information upstream and other agents can process that information downstream without any of the agents knowing about the others. For example, a daily scrape of portfolio information from a user's stock account by an upstream agent can be formatted by a downstream agent into a chart that is emailed to the user, and can be pushed into the user's accounting application by another agent. The information can be further analyzed for asset allocation purposes by yet another agent. In this way, information is effectively unlocked from a constrained location associated with a single provider and the functionality available from that provider.

The system also enables users to communicate through a number of channels. For example, the system enables users to send messages through voice, email or text channels to various individuals or groups. These messages can be delivered in the manner that the recipients want to receive them, based on the recipient's preferences, such as location, time of day, individually or batched, etc. Hence, this system can decouple the original mode of communication from the mode of communication that reaches each recipient and hence effectively puts the recipient in control. There are many existing systems that operate on information or messages, but there presently exists no universal platform through which a user can own and control their information and associated communications.

Various embodiments of the present invention are described in more detail below.

System

FIG. 1 illustrates a system which facilitates managing a collection of software agents in accordance with an embodiment of the present invention. This system is built around a hub 102, which receives messages, containing information and queries from agents and other system components and then distributes the messages to other agents and system components in accordance with user-specified wiring relationships. In doing so, hub 102 employs the user-specified wiring information to call agents on the user's behalf. (Hub 102 is described in more detail below with reference to FIG. 2.)

The system also includes a "user-experience website" 130. This user-experience website 130 allows a user 129 to specify how agents and system components are configured and how agents and system components are wired together to provide a desired functionality. For example, user experience website 130 can provide a graphical-editing tool which enables user 129 to configure agents and to link agents and system components together. User-experience website 130 also generates configuration information which can be stored in an agent configuration database 118. Configuration information from agent configuration database 118 is then used to configure various agents and system components, and is also used to establish communication pathways between agents and system components. For example, the user-specified wiring relationships can be used to configure hub 102 to route information between agents to accomplish a desired computational task.

In some embodiments, the system can use information extracted from usage database 104 to provide popularity/ranking information for agents through user-experience website 130. This allows the user to see which agents have been rated the highest or have been used the most. The system can also provide a recommendation engine that can suggest agents which might be useful to the user based upon information about the user and similar users.

One embodiment of the present invention also includes a prompter 108, which is a system component that receives information specifying how agents are to be prompted and how frequently the agents are to be prompted from agent configuration database 118. During operation, prompter 108 periodically prompts specified agents on behalf of specific users to provide information and then forwards the information received from the specified agents to hub 102. More specifically, in FIG. 1 prompter 108 periodically prompts agents 120 and 122 to provide information and then forwards the information to hub 102. For example, if agent 120 is able to retrieve bank balance information, prompter 108 can prompt agent 120 to obtain this bank-balance information once a day on behalf of user 129 and can forward the bank balance information received from agent 120 to hub 102.

In some embodiments, agents can be "stateless." For example, such an agent can receive state information, including both user-configuration information and agent-specific state from prompter 108. Note that this state information can be maintained by hub 102. For example, an agent that tells you if any new search results have appeared for a term can store previous search results for the term in hub 102 and have them sent along each time the agent is prompted.

In addition to receiving information from prompter 108, hub 102 can also receive information directly from agents, such as agent 123. Hub 102 can additionally receive messages from user 129 through one or more interface components. For example, in FIG. 1, hub 102 receives information from an email interface component 124, which is configured to receive a request from user 129 via email and to translate the request as necessary and forward the request to hub 102. Hub 102 also receives information from a text-message interface component 125, which is configured to receive a request from user 129 through a text message. Hub 102 can additionally receive information from a voice-interface component 126, which is configured to receive audio data containing a voice message from user 129. Note that voice-interface component 126 can include voice-recognition software which translates digitized audio input into text. Note that the three interface components listed above are merely provided as examples. In general, the system can accommodate a wide range of different types of interface components for existing or future interfaces. For example, the system can additionally provide an instant-messaging interface component.

Hub 102 can forward information to various agents, which are created by agent authors. For example, in FIG. 1, hub 102 sends messages to a distribution agent 114, which distributes the messages to users through a number of different communication channels, such as email, voice and text messages. Hub 102 can also forward information to a storage agent 116, which is configured to store data items in persistent storage. For example, storage agent 116 can be configured to store a data item in a database system.

The system also includes a billing component 109, which is configured to collect payments from users 110 and to distribute payments to agent authors 112. Note that billing component 109 operates in accordance with configuration information retrieved from billing configuration database 132. The billing information contained within billing configuration database 132 is received from agent authors 133 as well as from user experience website 130. For example, the user-specified wiring information from user-experience website can be used to determine which agents are used to accomplish a task, and billing-rate information from agent authors can be used to determine how much to charge the users for the use of the agents. During operation of the system, usage information from hub 102 and from agents and other system components is recorded in usage database 104. Billing component 109 uses this usage information to calculate which payments are to be received from which users, and to calculate how much to pay each agent author. Next, billing component requests and receives payments from users 110 and sends payments to agent authors 112. By providing such payments to agent authors, the present invention can provide a significant incentive to agent authors to develop new and useful agents.

Note that the various agents and components described above can be hosted on various servers and other computer systems distributed across a computer network, such as the Internet. For example, system components, such hub 102 and prompter 108, can reside at one or more remote servers. Moreover, agents can reside on a local computer system belonging to user 129 or on various remote computer systems or devices.

Hub Component

Figure 2:
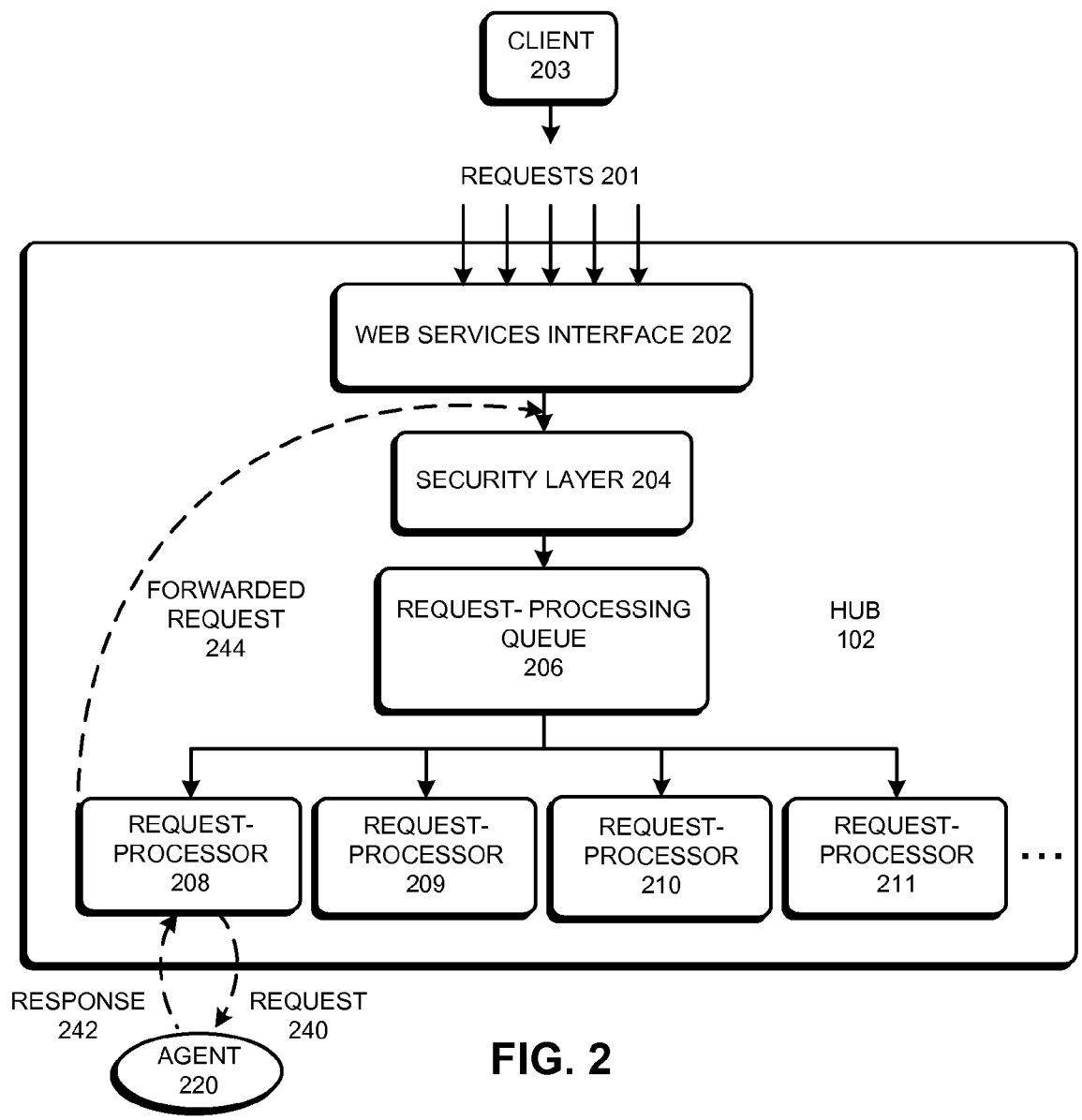
FIG. 2 illustrates the structure of a hub in accordance with an embodiment of the present invention.

FIG. 2 illustrates the structure of hub 102 in accordance with an embodiment of the present invention. Hub 102 receives requests 201 from various clients (which can include agents, users or other system components) at a web services interface 202. These requests feed through a security layer 204 which determines whether the requests are authorized, which can, for example, involve examining digital certificates, or can involve some other type of authentication or authorization process. Note that the system can also check configuration database 118 during the authorization process to eliminate "spam" (e.g., information from agents which have not been configured to be used).

The requests then feed into a request-processing queue 206, which stores requests that are waiting to be processed by a number of request-processors 208-211, which operate in parallel.

As illustrated in FIG. 2, while processing a request, a request processor 208 can make a request 240 to an agent 220. After agent 220 finishes processing the request, agent 220 sends a corresponding response 242 to request processor 208. In some cases, response 242 causes a subsequent request 244 to be generated and forwarded to security layer 204.

Note that the subsequent request 244 may generate a result which needs to be returned to the requesting client 203 in a way that enables the requesting client 203 to correlate the response with the initial request. This can be accomplished by allowing client 203 to attach some type of identifier to the initial request, and by ensuring that this identifier gets propagated through subsequent communications, so that the ultimate response to client 203 includes the same identifier. Client 203 can then use this identifier to correlate the initial request with the ultimate response, even if the initial request and ultimate response are communicated through different channels.

Alternatively, this entire process can be made transparent to client 203 by providing a proxy, which is associated with web services interface 202, to manage these identifiers and to communicate the ultimate response back to client 203 through the same channel through which the initial request was received.

Configuration Process

Figure 3:
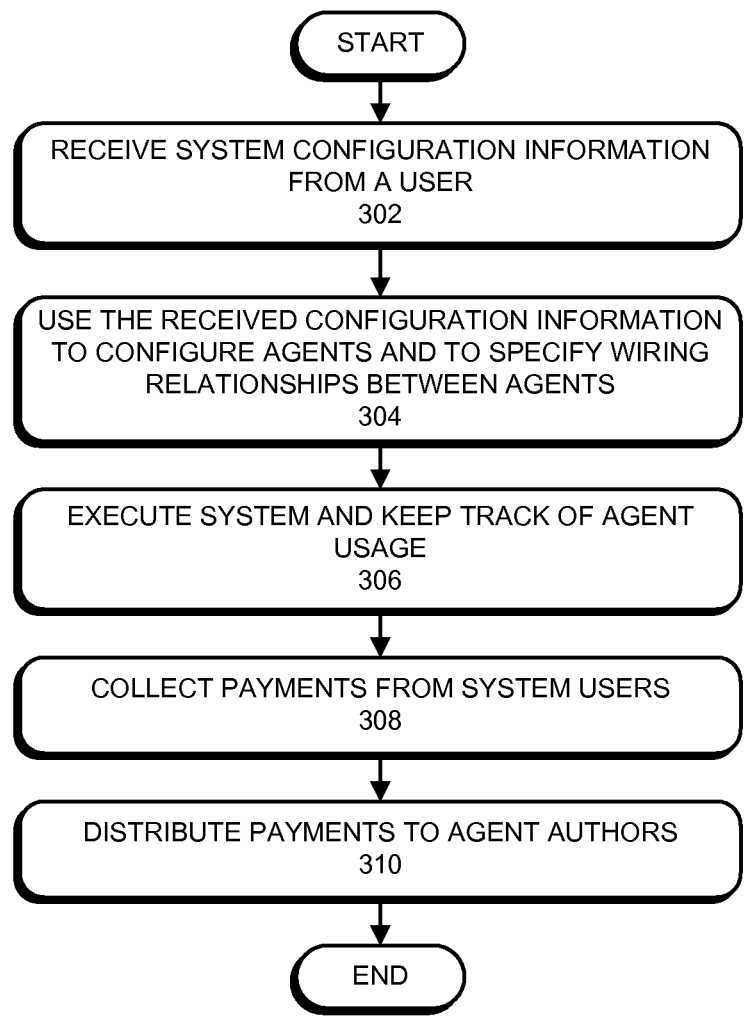
FIG. 3 presents a flow chart of the process of configuring agents in accordance with an embodiment of the present invention.

FIG. 3 presents a flow chart illustrating the process of configuring agents in accordance with an embodiment of the present invention. During operation, the system receives configuration information from user 129 (step 302). This configuration information can include specific configuration information for individual agents, as well as wiring relationships between agents and system components. For example, the configuration information can be received through a user interface (UI) which is part of user-experience website 130. This UI can provide a graphical interface which allows user 129 to graphically wire system components and agents together. As mentioned above, the system can use information extracted from usage database 104 to provide popularity/ranking information for agents through user-experience website 130. The system can also suggest agents which might be useful to the user based upon information about the user and similar users.

Next, the system uses the received configuration information to configure the agents and to specify wiring relationships between the agents (step 304).

After the system is configured, the system is executed (step 306). During this execution the system keeps track of the usage of various agents. This enables the system to subsequently collect payments from system users for their use of specific agents (step 308), and to also distribute the corresponding payments to agent authors (step 310). Note that the system can also receive some portion of the collected payments as a fee for facilitating the process.

We now describe a number of exemplary systems which can be implemented using the above-described framework.

Exemplary Web-Search-Ranking System

FIG. 4 illustrates an exemplary web-search-ranking system in accordance with an embodiment of the present invention. This system can be used to dynamically determine website rankings in response to specific queries. Note that the system illustrated in FIG. 2 can be initially configured by a user 129 through the user-experience website 130 illustrated in FIG. 1.

During operation, prompter 108 periodically calls a web-search-rank agent 402 at a user-specified frequency, for example once a day at 9 AM (step A). Within this call, prompter 108 provides one or more search terms and a set of Uniform Resource Locators (URLs) for websites of interest.

Note that system components and agents can communicate with each other through open Application Programming Interfaces (APIs), which specify how to call the agents and components and also specify what parameter formats to use for such calls.

Web-search-rank agent 402 then performs a web search based on the search terms through a search engine to produce an ordered list of search results. Finally, web-search-rank agent 402 determines rankings for the web sites of interest and reports these rankings back to prompter 108 (step B).

Prompter 108 then forwards the ranking information to hub 102 for processing by other agents (step C). Hub 102 uses the "wiring" specified by user 129 to send the ranking information to both distribution agent 404 (step D) and storage agent 406 (step E). Note that distribution agent 404 is configured to send the ranking information to user 129 through both an email message and an SMS text message. Moreover, storage agent 406 is configured to store the ranking information in a database 408.

Because of the decoupled agent-based structure of the above-described system, web-search-rank agent 402 does not need to know anything about distributing messages through email or about storing information in database systems because these aspects of the systems are implemented by other agents.

Exemplary Airline Check-In System

Figure 5A:
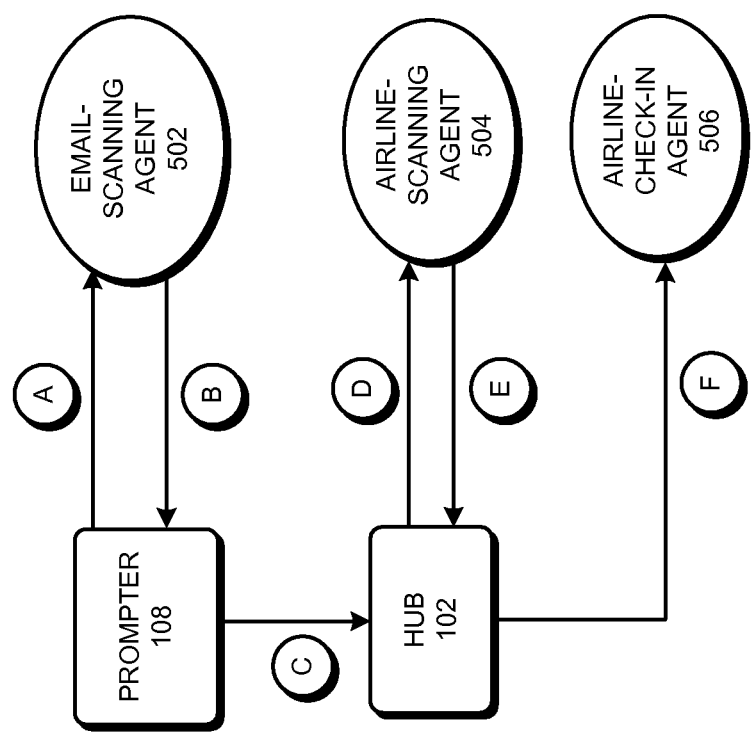
FIG. 5A illustrates part of an exemplary airline-check-in system in accordance with an embodiment of the present invention.
Figure 5B:
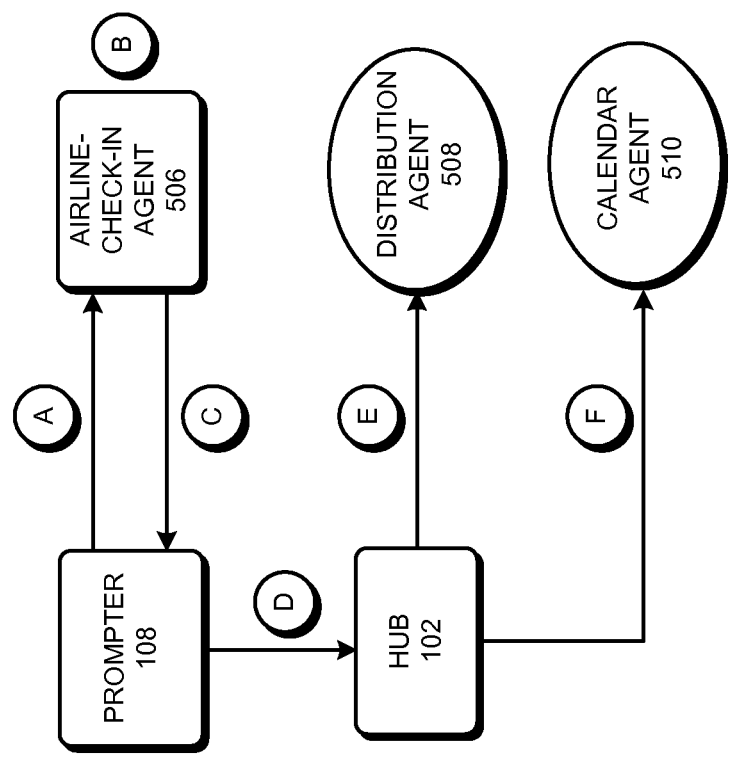
FIG. 5B illustrates part of an exemplary airline-check-in system in accordance with an embodiment of the present invention.

FIGS. 5A and 5B illustrate an exemplary airline-check-in system in accordance with an embodiment of the present invention. In this example, prompter 108 periodically calls email-scanning agent 502, which scans user 129's email (step A). In order to access user 129's email, email-scanning agent 502 may need to be configured to use specific passwords or credentials to access user 129's email. Alternatively, the emails can be scanned by a standalone desktop application which does not need to be prompted and sends emails directly to the web services interface 202.

Email-scanning agent 502 submits the new email messages it obtains to prompter 108 (step B). Note that various filters can be applied to these messages so that email-scanning agent 502 only submits specific types of messages.

Next, prompter 108 forwards the emails to hub 102 for processing by other agents (step C). Hub 102 then uses the wiring specified by user 129 to send the emails to airline-scanning agent 504 (step D), which looks for messages that contain airline flight confirmations.

If such a message is found, airline-scanning agent 504 returns a corresponding task to hub 102 (step E). This task causes hub 102 to create separate instances of an airline check-in agent 506 for both the outbound flight and the return flight (step F).

Referring to FIG. 5B, airline-check-in agent 506 automatically performs check-in operations and sends out a confirmation 24 hours in advance of the flight. More specifically, at the scheduled time prompter 108 calls airline-check-in agent 506 (step A). In response to this call, airline-check-in agent 506 simulates actions of user 129 while performing check-in operations at the airline's web site on the user's behalf. (Note that airline-check-in agent 506 can alternatively perform check-in operations using web services provided by the airline instead of performing a user simulation through the airline's website.) If the web site is unavailable, airline check-in agent 506 returns a reschedule request to prompter 108 (step B). Otherwise, airline check-in agent 506 returns a confirmation message for user 129 (step C). Prompter 108 then forwards the reschedule request or the confirmation message to hub 102 to be processed by other agents (step D).

If the request is a confirmation message, hub 102 uses the wiring specified by user 129 to send the message to distribution agent 508, which is configured to send the message to user 129 through a preferred communication channel, for example through a voice call (step E). Hub 102 can also send the message to calendar agent 510, which updates a calendar entry for the flight to indicate that the flight has been confirmed (step F).

Exemplary Database Search System

Figure 6:
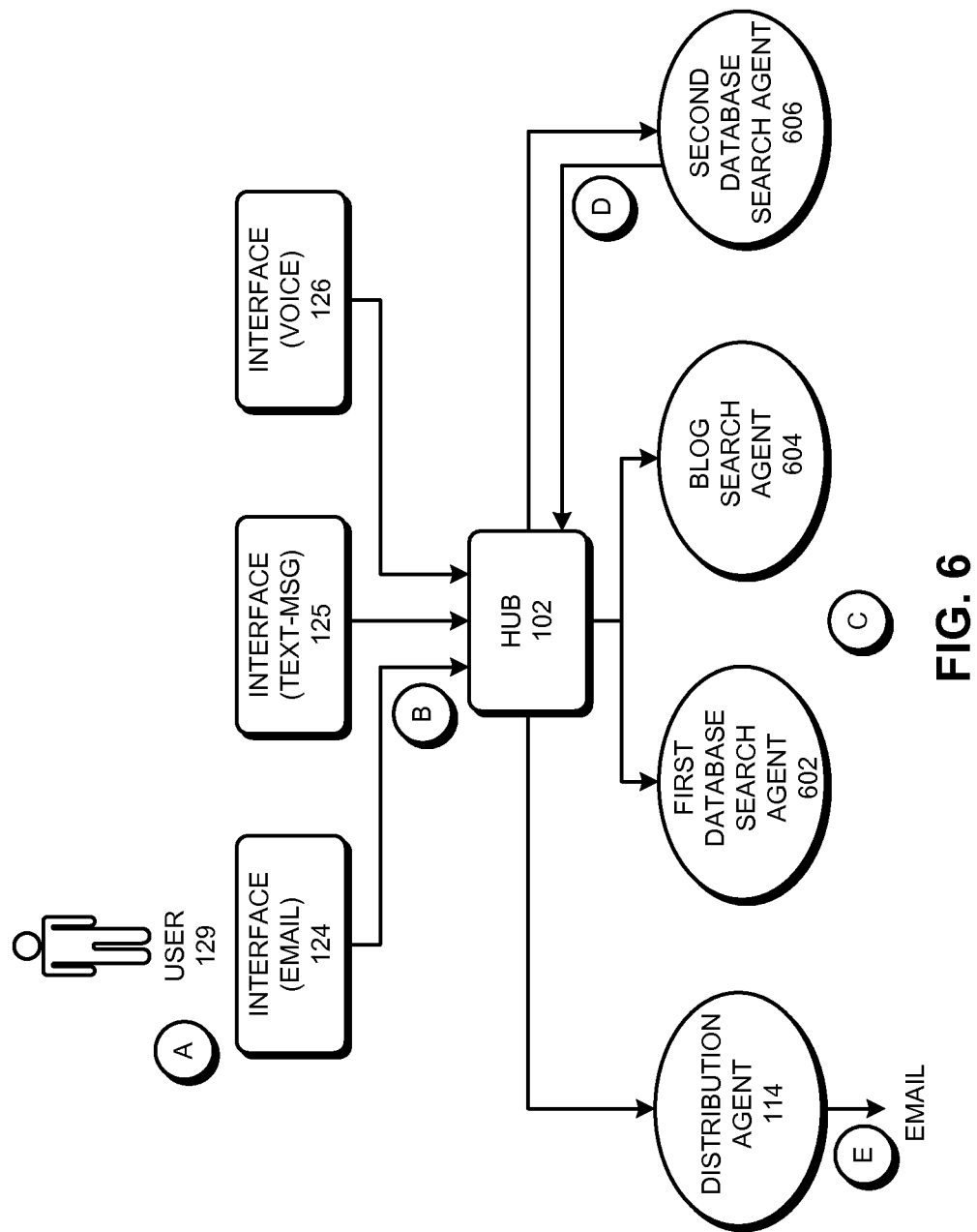
FIG. 6 illustrates an exemplary database-search system in accordance with an embodiment of the present invention.

FIG. 6 illustrates an exemplary database-search system in accordance with an embodiment of the present invention. In this exemplary system, a user 129 communicates a database query to the system through one or more of a number of interface components 124-126 (step A). More specifically, user 129 communicates the query to the system through one of: an email interface component 124, a text-message interface component 125, or a voice interface component 126. (As mentioned above, there are a large number of possible interface components.) The selected interface component then forwards the query to hub 102 (step B).

Hub 102 uses the wiring specified by user 129 to send the query to a number of agents for processing, including a first-database-search agent 602 which performs queries for a first type of database, a blog-search agent 604, and a second-database-search agent 606 which performs queries for a second type of database. In this example, the first-database-search agent 602 recognizes the request is not directed to a first type of database, so the first-database-search agent 602 takes no action. Similarly, the blog-search agent 604 recognizes the query is not directed to a blog so it takes no action (step C).

On the other hand, the second-database-search agent 606 recognizes that the query is directed to the second type of database, so the second-database-search agent 606 processes the query against an instance of the second type of database and returns the result to hub 102 (step D).

Hub 102 then uses the wiring specified by user 129 to return the result to user 129 through distribution agent 114 in a user-specified format (step E). Note that this system can be configured to use a different communication channel to receive a query and to send query results. For example, the system can receive a voice query from a user, such as "identify all my active customers within 10 miles of Oakland," through a phone line and can return the requested list to the user via email, because the list is likely to be too long to be conveniently received through a voice interface.

Exemplary User-Location System

Figure 7A:
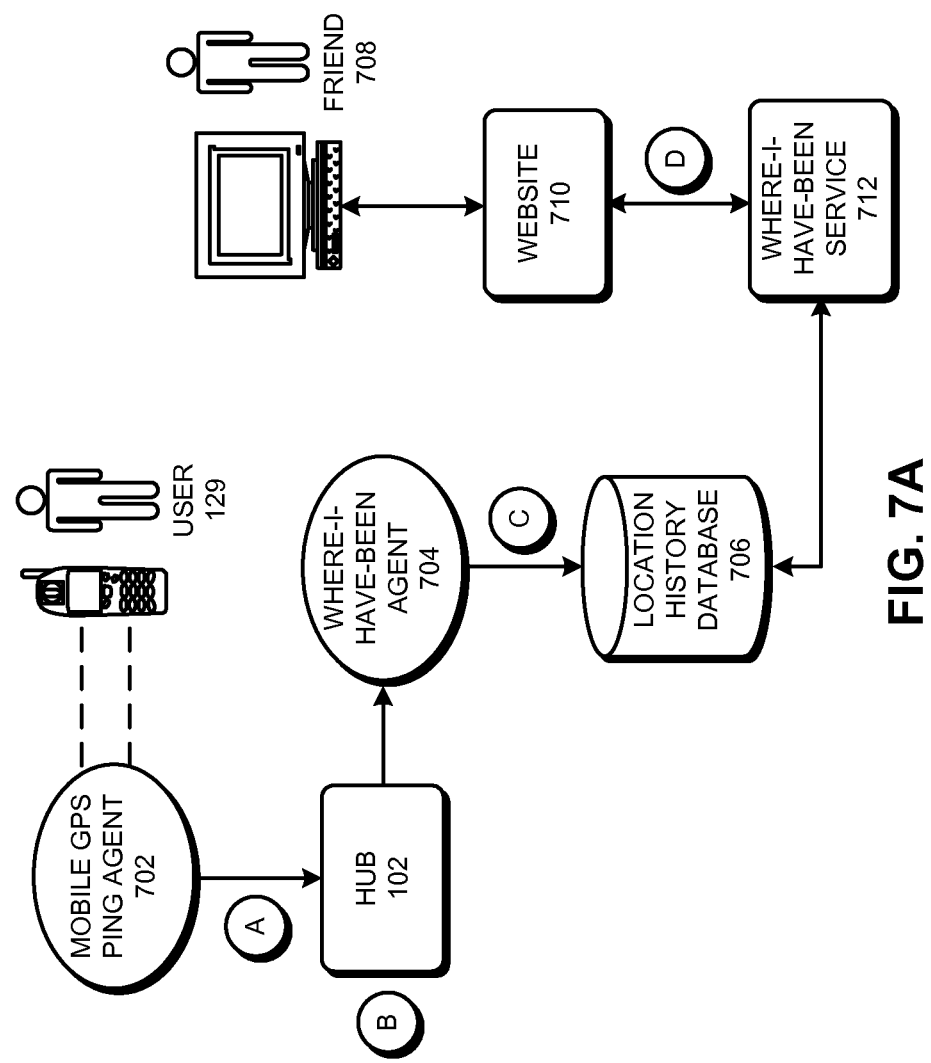
FIG. 7A illustrates part of an exemplary user-location system in accordance with an embodiment of the present invention.
Figure 7B:
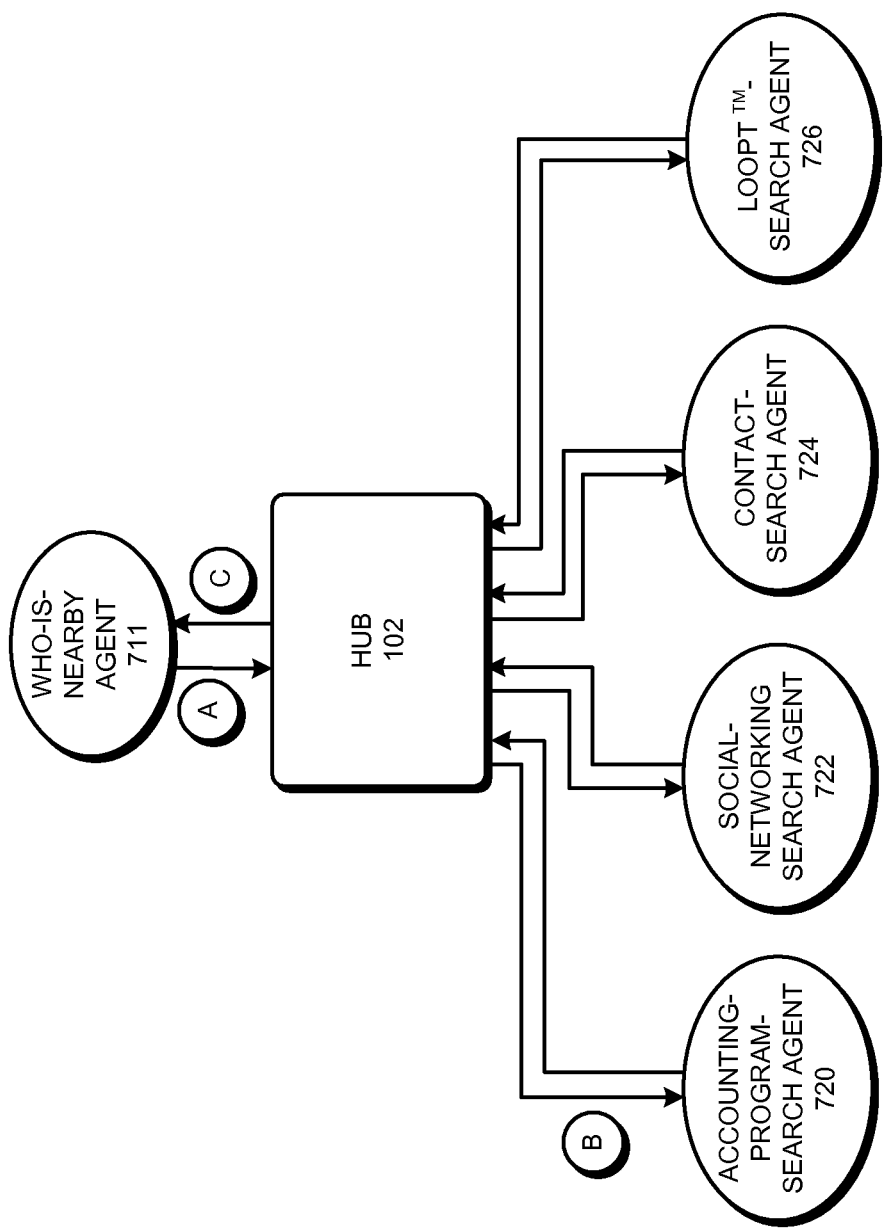
FIG. 7B illustrates part of an exemplary user-location system in accordance with an embodiment of the present invention.

FIGS. 7A and 7B illustrate an exemplary user-location system in accordance with an embodiment of the present invention. In this example, a mobile-Global-Position-System (GPS)-ping agent 702, which, for example, can reside on user 129's cell phone 709, periodically sends the current location for user 129 to hub 102 (step A). Hub 102 then uses the wiring specified by user 129 to send the location information to a where-I-have-been agent 704, which stores the information in a location history database 706 (step C).

This location information can be subsequently accessed by a where-I-have-been service 712, which can, for example, generate a map showing where user 129 has been. This enables a friend 708 of user 129 to see where user 129 has been by accessing a website 710, which retrieves information from where-I-have-been service 712 (step D).

Referring to FIG. 7B, when user 129 changes location significantly, a who-is-nearby agent 711 sends a query to hub 102 asking the system to search for contacts near user 129's present location (step A). Hub 102 then uses the wiring specified by user 129 to send the query to a number of agents for processing, including: an accounting-program search agent 720, which searches through contact information contained in an accounting program; social-network-search agent 722, which searches for acquaintances of user 129 on a social-networking site; contacts-search agent 724, which searches through a set of contacts in an address book for user 129; and Loopt™-search agent 726, which keeps track of nearby friends of user 129 through a mobile-phone based application (step B). The above-described agents return information to hub 102 for geographically proximate contacts of user 129. Hub 102 then returns the contacts to who-is-nearby agent 711 (step C), which can return a message to user 129 via hub 102 and distribution agent 114. Note that distribution agent 114 can use various user-specified communication channels, such as voice, email or text messaging to communicate with user 129.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims

What is claimed is:

1. A system for managing agents, comprising:
a processor with a memory communicatively coupled to the processor;
a set of system components configured to coordinate interactions between the agents;
a hub component within the set of system components that is configured to route communications to and from each of the agents, wherein, for each user in a plurality of users, the hub component is configured to route communications for the user to and from a set of the agents in accordance with a user-specified wiring relationship for the user between the set of the agents;
a plurality of request processors in the hub component, each request processor configured to communicate requests to agents in the set of agents to which the requests are directed and to receive corresponding responses from the agents, wherein the request processors are configured to enable parallel processing of separate requests;
a configuration component within the set of system components, wherein the configuration component enables the user to configure agents and to specify the set of the agents and the wiring relationship for the user between the set of the agents;
a user-experience website within the set of system components, the user-experience website configured to provide a graphical editing tool which enables the user to configure agents, link agent and system components; and generate configuration information;
one or more interface components within the set of system components, wherein the one or more interface components provide popularity and ranking information for agents through the user-experience website, suggest agents to the user based upon use information about the user and similar users, and receive a request from the user and forward the request to the hub component; and
a billing component within the set of system components, wherein, for each user in the plurality of users, the billing component is configured to use the user-specified wiring relationship for the user and billing rate information for one or more of the agents to determine a charge for the user, and collect payments from users and to distribute payments to agent authors.

2. The system of claim 1, further comprising a prompter component within the set of system components, wherein the prompter component is configured to call one or more agents at user-specified times and to forward data items returned by calls.

3. The system of claim 1, wherein the one or more interface components includes one or more of:
an email interface component, which is configured to receive a request from the given user via email;
a text-message interface component, which is configured to receive a request from the given user through a text message; and
a voice interface component, which is configured to receive an audio voice request from the given user.

4. The system of claim 1, wherein the agents include a storage agent which is configured to store data items in persistent storage.

5. The system of claim 1, wherein the agents include a distribution agent which is configured to distribute messages to users.

6. The system of claim 1, wherein components in the set of system components are configured to communicate messages containing information and queries between agents and components.

7. The system of claim 1, wherein the information can be structured in accordance with pre-defined micro-formats.

8. A method for managing agents, comprising:
receiving system configuration information from a plurality of users; and
using the system configuration information for each user to configure a set of the agents and to specify a wiring relationship for the user between the set of the agents, wherein the wiring relationship specifies connections between the set of the agents and a set of system components;
wherein the set of system components includes:
a hub component that is configured to route communications to and from each of the agents, wherein the hub is configured to route communications for the user to and from the set of the agents for the user in accordance with the user-specified wiring relationship between the set of the agents;
a plurality of request processors in the hub component, each request processor configured to communicate requests to agents in the set of agents to which the requests are directed and to receive corresponding responses from the agents, wherein the request processors are configured to enable parallel processing of separate requests;
a user-experience website within the set of system components, the user-experience website configured to provide a graphical editing tool which enables the user to configure agents, link agent and system components, and generate configuration information;
one or more interface components within the set of system components, wherein the one or more interface components provide popularity and ranking information for agents through the user-experience website, suggest agents to the user based upon use information about the user and similar users, and receive a request from the user and forward the request to the hub component; and
a billing component within the set of system components, wherein, for each user in the plurality of users, the billing component is configured to use the user-specified wiring relationship for the user and billing rate information for one or more of the agents to determine a charge for the user, and collect payments from users and to distribute payments to agent authors.

9. The method of claim 8, wherein the set of system components includes a prompter component which is configured to call one or more agents at user-specified times and to forward data items returned by calls.

10. The method of claim 8, wherein the one or more interface components includes one or more of:
  an email interface component, which is configured to receive a request from the given user via email;
  a text-message interface component, which is configured to receive a request from the given user through a text message; and
  a voice interface component, which is configured to receive an audio voice request from the given user.

11. The method of claim 8, wherein the agents include a storage agent which is configured to store data items in persistent storage.

12. The method of claim 8, wherein the agents include a distribution agent which is configured to distribute messages to users.

13. The method of claim 8, wherein components in the set of system components are configured to communicate messages containing information and queries between agents and components.

14. The method of claim 8, wherein the information can be structured in accordance with pre-defined micro-formats.

15. A non-transitory computer-readable storage medium storing instructions that when executed by a computer cause the computer to perform a method for receiving system configuration information from a user, wherein the method comprises:
  receiving system configuration information from a plurality of users; and
  using the system configuration information for each user to configure a set of the agents and to specify a wiring relationship for the user between the set of the agents, wherein the wiring relationship specifies connections between the set of the agents and a set of system components;
  wherein the set of system components includes:
    a hub component that is configured to route communications to and from each of the agents, wherein the hub is configured to route communications for the user to and from the set of the agents in accordance with the user-specified wiring relationship for the user between the set of the agents;
    a plurality of request processors in the hub component, each request processor configured to communicate requests to agents in the set of agents to which the requests are directed and to receive corresponding responses from the agents, wherein the request processors are configured to enable parallel processing of separate requests;
    a user-experience website within the set of system components, the user-experience website configured to provide a graphical editing tool which enables the user to configure agents, link agent and system components, and generate configuration information;
    one or more interface components within the set of system components, wherein the one or more interface components provide popularity and ranking information for agents through the user-experience website, suggest agents to the user based upon use information about the user and similar users, and receive a request from the user and forward the request to the hub component; and
    a billing component within the set of system components, wherein, for each user in the plurality of users, the billing component is configured to use the user-specified wiring relationship for the user and billing rate information for one or more of the agents to determine a charge for the user, and collect payments from users and to distribute payments to agent authors.

16. The computer-readable storage medium of claim 15, wherein the set of system components includes a prompter component which is configured to call one or more agents at user-specified times and to forward data items returned by calls.

17. The computer-readable storage medium of claim 15, wherein the one or more interface components includes one or more of:
  an email interface component, which is configured to receive a request from the given user via email;
  a text-message interface component, which is configured to receive a request from the given user through a text message; and
  a voice interface component, which is configured to receive an audio voice request from the given user.

* * * * *